United States Patent [19]

Davenport et al.

[11] Patent Number: 4,746,100

[45] Date of Patent: May 24, 1988

[54] WINCH DRAG BRAKE APPARATUS

[75] Inventors: Richard G. Davenport, Metamora; Duane R. Smith, Oswego; R. Paul Cobb, Washington, all of Ill.

[73] Assignee: Caterpillar Inc., Peoria, Ill.

[21] Appl. No.: 946,256

[22] Filed: Dec. 24, 1986

[51] Int. Cl.$^4$ .................. B66D 5/26; F16D 65/14
[52] U.S. Cl. .................. 254/379; 254/328; 254/349; 254/368; 188/83; 188/106 F; 188/170
[58] Field of Search ............... 254/328, 347, 346, 349, 254/378, 379; 188/170, 83, 106 F

[56] References Cited

U.S. PATENT DOCUMENTS

| | | | |
|---|---|---|---|
| 3,220,702 | 11/1965 | Caldwell | 254/365 |
| 3,841,608 | 10/1974 | Schmitt et al. | 254/365 |
| 3,848,852 | 11/1974 | Therkildsen | 254/365 |
| 3,853,303 | 12/1974 | Wineburner | 254/365 |
| 4,057,297 | 11/1977 | Beck et al. | 188/72.3 X |
| 4,076,219 | 2/1978 | Behrends et al. | 254/365 |
| 4,337,926 | 7/1982 | Dehaan | 254/367 X |
| 4,358,088 | 11/1982 | House et al. | 254/349 |
| 4,406,354 | 9/1983 | Barsted | 188/170 X |
| 4,560,148 | 12/1985 | Palmer | 254/323 |

Primary Examiner—Stuart S. Levy
Assistant Examiner—Katherine Matecki
Attorney, Agent, or Firm—Lanchantin, Jr., Charles E.

[57] ABSTRACT

In order to overcome the disadvantage of overspinning of a winch drum when a disconnect device adjacent the drum is disengaged, a drag brake apparatus is provided for limitedly restricting the rotation of the drum when an actuator having a braking element is continually urged against the drum by a spring. A control mechanism includes a control lever assembly movable to operate a hydraulic valve assembly for the primary control of the winch drum, and movable to operate an associated valve for controllably directing pressurized fluid to the actuator for supplementing the spring force. Thus, a first drag brake mode can be attained for substantially freespool operation of the drum, and a second drag brake mode can be attained for controlled load dropping operation of the drum.

20 Claims, 5 Drawing Sheets

Fig_3_

Fig_5_

WINCH DRAG BRAKE APPARATUS

DESCRIPTION

1. Technical Field

This invention relates to a winch for receiving and releasing a cable from a drum, and more particularly to a powered winch having an auxiliary drag brake apparatus for controllably paying out the cable and minimizing overspinning of the drum.

2. Background Art

Winches which are adapted to mount on a vehicle for towing and logging applications are well-known. One type has a normally disengaged input clutch assembly associated with a gear train for powerably rotating the drum, a normally engaged primary brake mechanism for holding the drum against rotation in at least one direction, and a normally engaged disconnect device or coupling that is generally located in the gear train near the winch drum. Disengagement of the disconnect coupling allows substantially freespool operation of the drum. U.S. Pat. No. 3,841,608 issued Oct. 15, 1974 to J. L. Schmitt et al.; U.S. Pat. No. 3,848,852 issued Nov. 19, 1974 to H. T. Therkildsen; and U.S. Pat. No. 3,853,303 issued Dec. 10, 1974 to R. E. Wineburner are representative of these winches.

In such winches the primary brake mechanism can be released in a Brake-Off position of the actuating member so that load forces pulling on the cable can unwind it from the drum against the resistance created by the natural drag of the components of the gear train. This internal resistance is often great enough that some loads cannot be dropped as fast as desired, and this resistance makes it difficult or impossible to manually unreel cable from the drum. So in order to solve these problems a Drum-Disconnect position of the actuating member is provided for uncoupling the gear train at the disconnect coupling.

While easier unreeling of cable from the drum in the Drum-Disconnect mode is highly useful, there is so little resistance to rotation of the drum that overspinning of the drum can occur with a heavy load on the cable. If continued rotation of the drum is permitted after the heavy load contacts the earth and line pull has stopped, the cable can become loose and tangled. In order to solve this problem a mechanical auxiliary drag brake is sometimes used to continuously apply a relatively limited friction force against a surface of the drum. For example, a plunger mounted in the winch housing can be continuously urged against the drum by a compression spring mounted upon a manually adjusted spring seat.

Above-mentioned U.S. Pat. No. 3,853,303 differs from such spring-applied auxiliary drag brake devices by disclosing an auxiliary brake assembly using hydraulic pressure at a preselected pressure level to force a piston and plunger against the drum. That assembly provides a single force which is, however, manually adjustable by changing the load of a compression spring normally urging the plunger and piston out of frictional engagement with the drum. But it has the disadvantage of continually providing a relatively significant braking action directly upon the drum whenever the disconnect clutch is disengaged.

Accordingly, what is desired is an auxiliary drag brake for a winch that will function in the disengaged position of the disconnect device to selectively provide at least two levels of friction drag to resist reeling out of the cable wound on the drum. In a first mode of operation the auxiliary drag setting should be relatively low so that the drum is capable of relatively easy freespooling to allow an operator to manually pull out the cable. In a second mode the auxiliary drag setting should be at a higher intermediate setting so that the usual load on the cable can be controllably dropped to the ground and overspinning of the drum can be prevented. In the latter instance, operators of prior art devices have attempted to stop overspinning of the drum by positioning the winch control lever assembly back to the Brake-Off mode wherein the disconnect clutch is reengaged. But with the disconnect device usually being of the economical sliding collar type, the gear teeth thereof are caused to reengage each other at a substantial speed differential causing undesirable ratcheting and a significant decrease in the service life thereof.

The present invention is directed to overcoming one or more of the problems as set forth above.

DISCLOSURE OF THE INVENTION

In accordance with one aspect of the present invention a winch having a drum, a power train for controllably rotating the drum and braking the drum, and disconnect means for uncoupling the power train near the drum, includes control mechanism means for controlling operation of the power train and the disconnect means, and auxiliary brake means for limitedly restricting rotation of the drum in the disengaged position of the disconnect means by providing a first drag brake mode for substantially freespool operation of the drum and a second drag brake mode for controlled load dropping operation of the drum.

In accordance with another aspect of the invention a winch has a drum, a power train for rotating the drum, a disconnect device for uncoupling the power train adjacent the drum, and a primary brake mechanism. A winch drag brake apparatus is provided therefor including auxiliary brake means for limitedly restricting rotation of the drum in the disengaged position of the disconnect device and disengaged condition of the primary brake mechanism, and control mechanism means for controllably placing the auxiliary brake means into either a relatively low friction drag level or a relatively moderate friction drag level upon the drum.

Advantageously, the drag brake apparatus features means for mechanically urging a braking element against the drum in the first drag brake mode and permitting an operator to conveniently manually unreel the cable from the drum, and for mechanically and hydraulically urging the braking element against the drum in the second drag brake mode and permitting a load on the winch cable to be controllably dropped in the disengaged condition of the disconnect device.

DESCRIPTION OF THE PREFERRED EMBODIMENT

Figure 1:
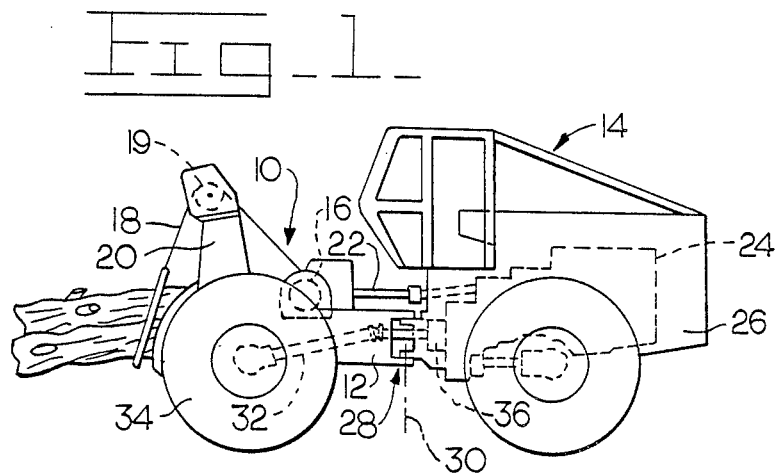
FIG. 1 is a side elevational view of a log skidder vehicle employing a winch and a drag brake apparatus therefor in accordance with the present invention, and showing certain hidden portions thereof in broken lines.

FIG. 1 illustrates a winch 10 installed on a rear portion 12 of a log skidder vehicle 14 and having a cable drum 16 and a cable 18 thereon which extends rearwardly through a fairlead sheave assembly 19 of a logging arch 20. The winch is driven by a live power takeoff shaft 22 extending rearwardly from a conventional engine and transmission assembly 24 mounted on a front portion 26 of the vehicle. The front and rear portions of the vehicle are articulatably coupled together at a swing joint 28 for pivotal movement about a generally centrally located vertical axis 30, and the power takeoff shaft and a drive line 32 to the rear wheels 34 extend across this swing joint. A parking brake 36 is coupled to the drive line for preventing inadvertent movement of the vehicle in the usual manner.

Figure 2:
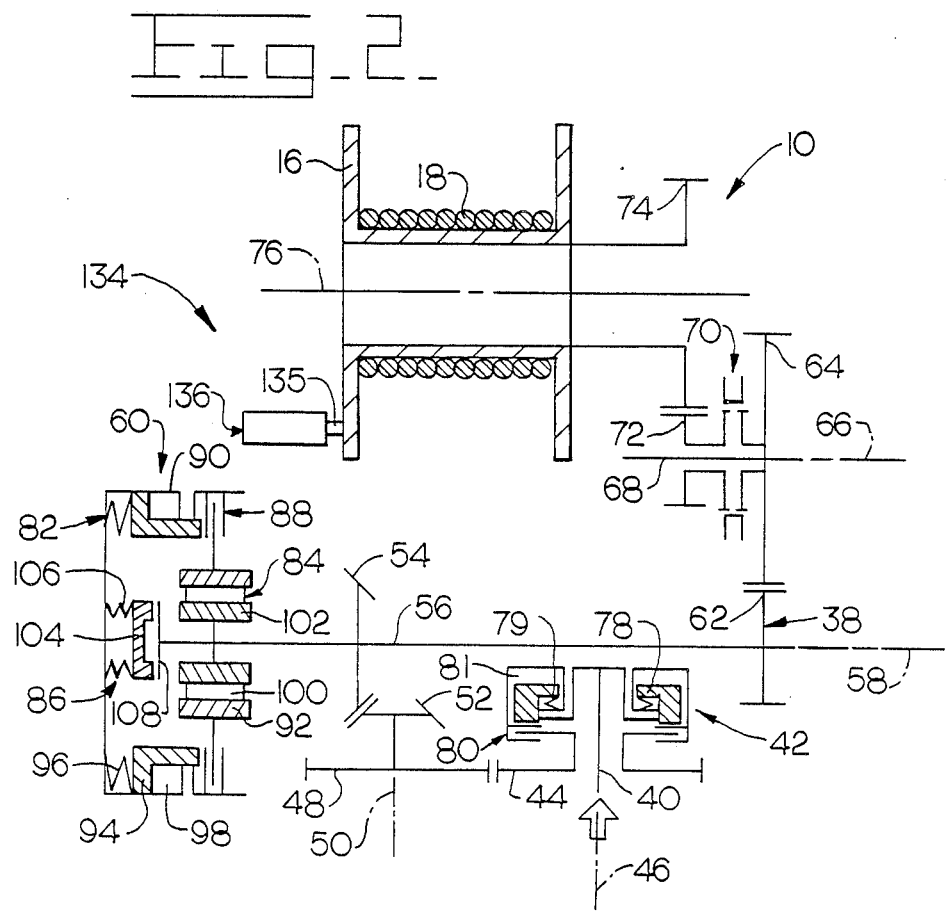
FIG. 2 is a diagrammatic and enlarged plan view of the internal gear train of the winch illustrated in FIG. 1 showing in line outline form broad details of construction thereof and including the relationship of the drag brake actuator to the winch drum.

As shown in FIG. 2, the winch 10 has a power train 38 including a live input shaft 40 driven by the power takeoff shaft 22, an input disc clutch assembly 42, and an input gear 44 arranged along a longitudinal first axis 46. Another gear 48 is driven by the input gear about a second axis 50, and a bevel pinion gear 52 conjointly associated therewith is adapted to drive a bevel gear 54 and a main cross shaft 56 arranged along a transverse third axis 58. A brake mechanism 60 is connected to the left end of the cross shaft when viewing FIG. 2, and another gear 62 is connected to the right end thereof. A transfer gear 64 is intermeshingly engaged with the gear 62 and is supported for rotation about a fourth axis 66 on another cross shaft 68. A freespool disconnect device 70 is provided for selectively connecting the transfer gear 64 to an intermediate pinion gear 72 otherwise freely rotatably mounted on the cross shaft 68. The intermediate pinion gear 72 is intermeshingly engaged with a bull gear 74 connected for conjoint rotation with the drum 16 about a fifth axis 76.

More particularly, the input disc clutch assembly 42 is of conventional construction and is used to selectively transmit power to the winch 10 from the live power takeoff shaft 22. It is substantially nonmodulated so that it is not used to regulate the speed of the cable 18. It is hydraulically engaged, and spring disengaged, and for this purpose includes an actuating piston 78 and a plurality of piston retracting springs 79. Actuation of the piston causes the engagement of a plurality of interleaved plates and discs which are identified generally by the reference number 80 so that the input shaft 40 is connected to the input gear 44 for conjoint rotation. Particularly, the piston is moved downwardly for engagement when viewing FIG. 2 in response to the delivery of pressurized fluid to an annular clutch actuation chamber 81 behind the piston 78.

The brake mechanism 60 includes a disc brake assembly 82, an anti-fallback device or one-way sprag clutch 84, and a relatively light cross shaft drag brake 86. The disc brake assembly 82 includes a plurality of interleaved plates and discs identified generally by the reference number 88 which are alternately coupled to a winch frame or case 90 and to an outer race 92 of the sprag clutch. The disc brake assembly further includes a spring engaged and hydraulically disengaged actuating piston 94 that is urged to the right when viewing FIG. 2 by a plurality of compression springs 96 such as the Belleville washers illustrated. When pressurized fluid is delivered to a retraction chamber 98, the piston is moved to the left against the loading of the springs. The brake is held in a "normally on" position by the springs and is released only for the Brake-Off and Drum-Disconnect functions.

The conventional one-way sprag clutch 84 has a plurality of roller elements 100 connected between the outer race 92 and an inner race 102 secured for joint rotation with the main cross shaft 56.

A relatively light drag load is continually placed on the main cross shaft 56 by the drag brake 86 in order to overcome any tendency of the main cross shaft to rotate as a result of viscous drag between the clutch plates and discs 80 when the input disc clutch assembly 42 is disengaged. For this purpose the drag brake includes a brake plate 104 which is continually urged to the right when viewing FIG. 2 by a plurality of compression springs 106 seated between the case 90 and the brake plate. The brake plate is adapted to continually abut an end plate 108 secured to the left end of the main cross shaft 56.

Figure 3:
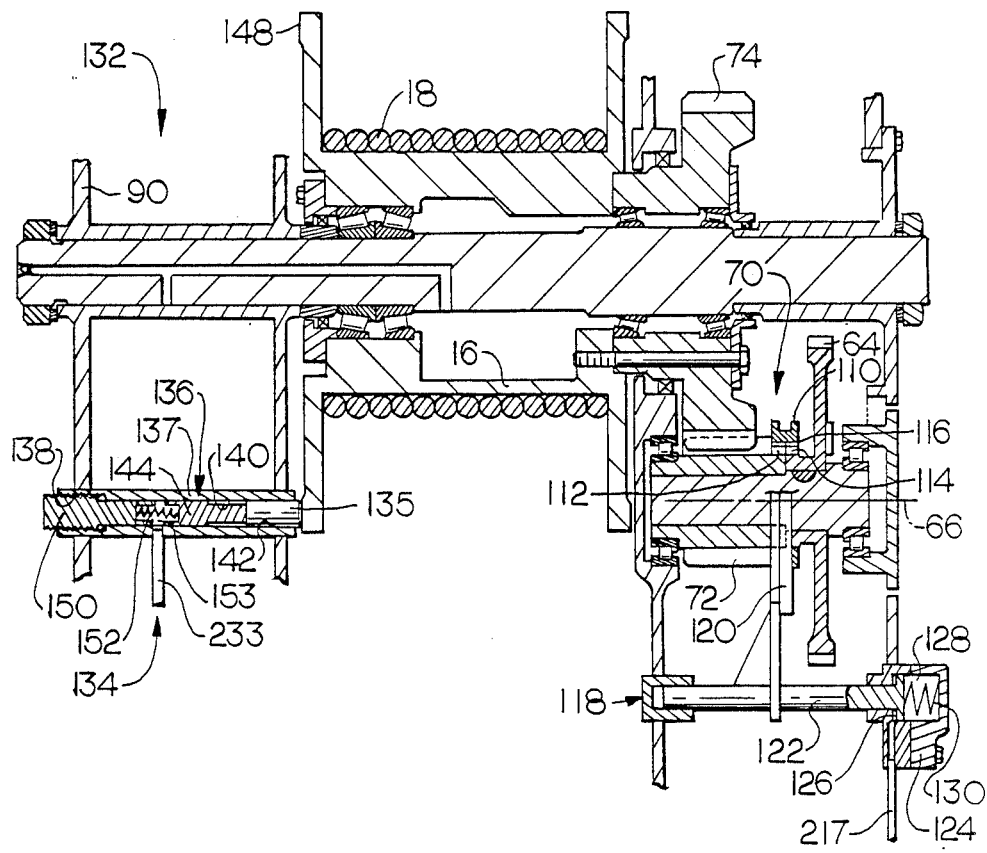
FIG. 3 is an enlarged, fragmentary cross sectional view of the winch shown in FIGS. 1 and 2 illustrating specific details of the drag brake actuator, and the shifting fork actuator associated with the drum disconnect device.

Referring now to the freespool disconnect device 70 illustrated in more detail in FIG. 3, it features a sliding collar 110 which, when hydraulically actuated, disengages the transfer gear 64 from the intermediate pinion gear 72. This allows the bull gear 74 and winch drum 16 to be rotated independently of the remainder of the power train 38. A plurality of external coupling teeth 112 are peripherally formed at one side of the intermediate pinion gear 72, and a plurality of external coupling teeth 114 are peripherally formed at a juxtaposed side of the transfer gear 64. The sliding collar 110 has a corresponding plurality of internal coupling teeth 116 associated therewith and is shiftable along the axis 66 by a shifting fork actuator 118. Movement of this actuator controls the positioning of a shifting fork 120 embracing the sliding collar. The actuator has an elongate piston element 122 connected to the shifting fork which is received in a stationary body 124 so as to define a retraction chamber 126 and a spring chamber 128 therebetween. The piston element is continually urged to the left when viewing FIG. 3 to the normally engaged state wherein the coupling teeth 112 and 116 are connected together by one or more compression springs 130 located in the spring chamber. The piston element is disengaged such that the coupling teeth 112 and 116 are axially separated by the delivery of pressurized fluid to the retraction chamber. Although not illustrated, the coupling teeth 112 and 116 are rounded or otherwise contoured to facilitate smooth reengagement of the collar 110 as it is moved leftwardly in FIG. 3 with the coupling teeth 112 of the intermediate pinion gear 72.

Figure 4:
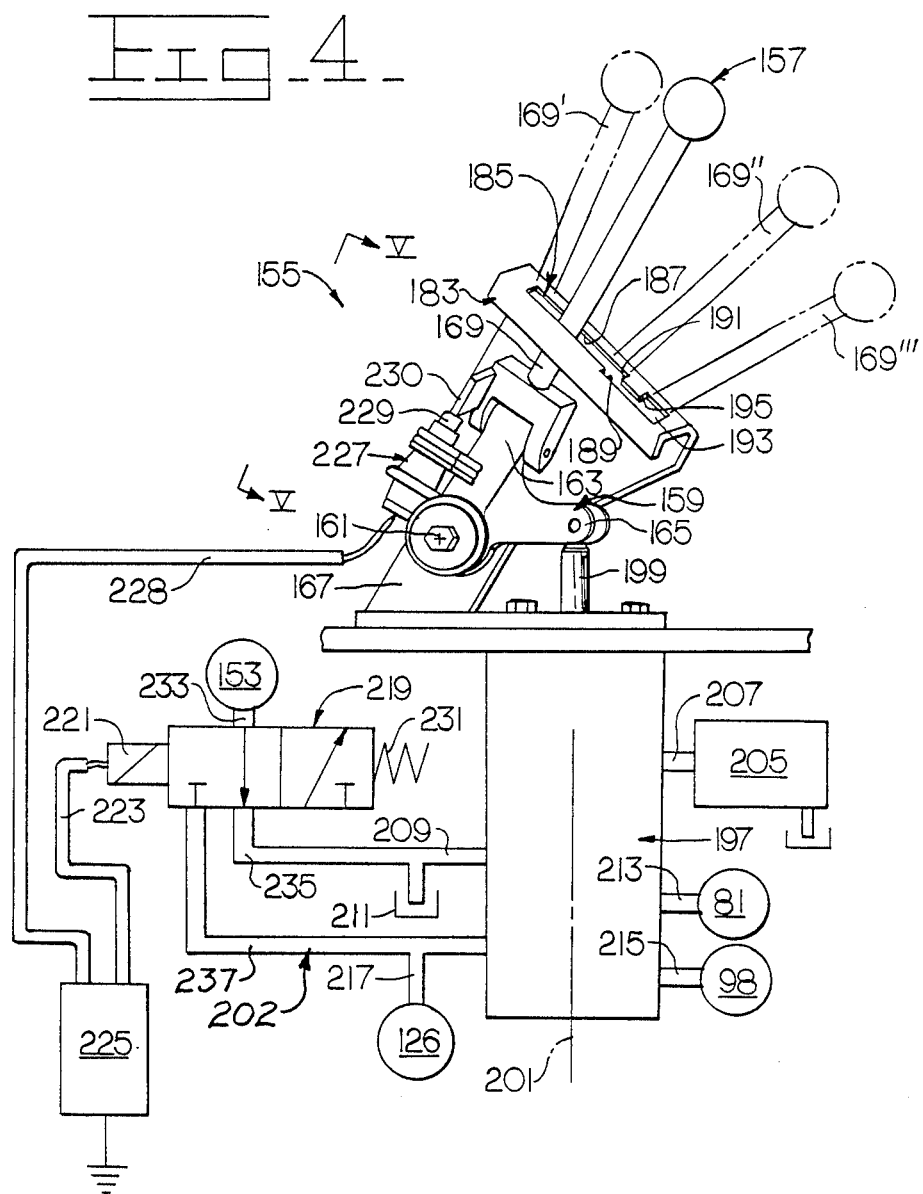
FIG. 4 is a diagrammatic elevational view of a winch control lever assembly and associated hydraulic valve assembly, and an electric solenoid operated hydraulic valve showing the relationship thereof to an hydraulic circuit for controlling the winch of FIGS. 1-3.

In accordance with the present invention, and as shown in FIGS. 3 and 4, a hydraulically controlled winch drag brake apparatus 132 is operatively associated with the winch drum 16 for controllably paying out the cable 18 and minimizing overspinning of the drum in the Drum-Disconnect mode. The drag brake apparatus includes auxiliary brake means 134 for limitedly restricting rotation of the drum in the disengaged position of the disconnect device 70 and providing a first drag brake mode for substantially freespool operation thereof and a second drag brake mode for controlled load dropping operation of the drum.

More specifically, the auxiliary brake means 134 includes a replaceable plunger or cylindrical braking element 135 of wear-resistant friction material and actuator means 136 for hydraulically urging the element against the drum 16 in the second drag brake mode. The actuator means includes a generally tubular body 137 secured to the winch frame 90 and defining an internally threaded outer portion 138, a central cylindrical bore 140, and an inner cylindrical bore 142 of slightly smaller diameter than the bore 140. A spool or piston 144 is located in the bore 140, and the braking element 135 is located in the bore 142 and extends axially inwardly therefrom to contact an annular end surface 148 of the drum 16. A manually adjustable spring seat 150 is screwthreadably received in the threaded outer portion of the body, and a compression spring 152 is in contact with the seat and with the spool 144 to continually mechanically urge it and the braking element against the end surface of the drum. A drag brake actuation chamber 153 is defined between the spring seat and the spool within the body to allow hydraulic actuation thereof.

Figure 5:
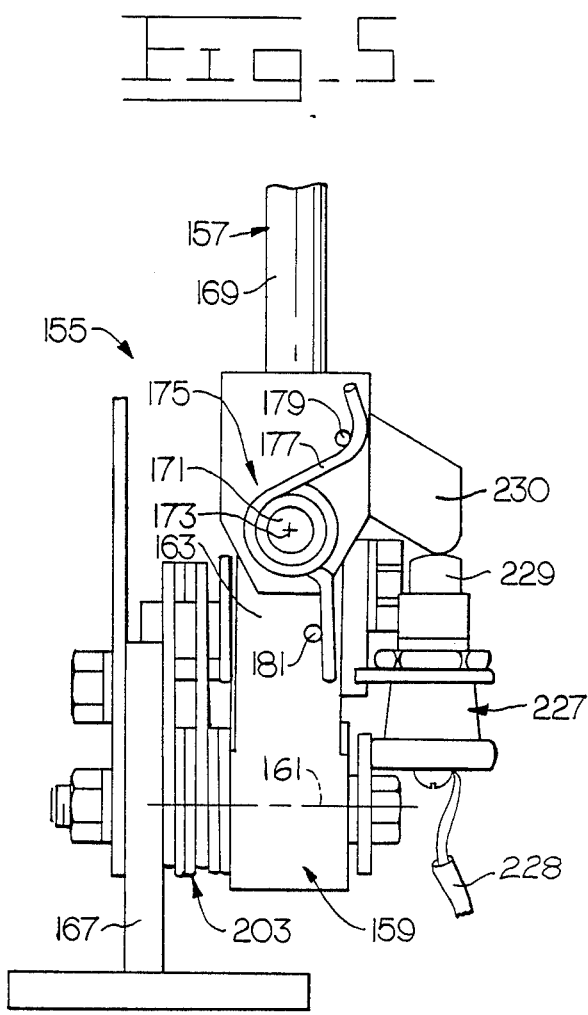
FIG. 5 is an enlarged and fragmentary rear elevational view of the control lever assembly for the winch as taken along line V—V of FIG. 4 showing details of construction thereof.

As shown in FIGS. 4 and 5, the winch drag brake apparatus 132 includes a control mechanism 155 for operating the auxiliary brake means 134 which is actuated by a control lever assembly or actuating member 157. The control lever assembly 157 is preferably located at the right hand side of the vehicle operator and includes a lower lever portion or bellcrank 159 mounted for swinging movement about a horizontal first axis 161 oriented substantially transversely to the normal longitudinal path of travel of the vehicle 14. The bellcrank 159 has an upwardly extending first arm 163 and a forwardly extending second arm 165, and is pivotally mounted on an inclined standard or pedestal 167 in a conventional manner. The control lever assembly also includes an upper lever portion 169 mounted on the upwardly extending first arm of the bellcrank for pivotal movement about a cylindrical pivot pin 171 arranged along a second axis 173 oriented normal to the first axis 161. A biasing mechanism 175 is provided for continually urging the upper lever portion pivotally about the second axis 173 in a counterclockwise direction when viewing FIG. 5. This biasing mechanism includes a relatively light spring 177 mounted in encircling relation to the pivot pin and having opposite ends which are respectively engaged with a first dowel or pin 179 secured to the upper lever portion and a second dowel or pin 181 secured to the bellcrank arm 163.

As shown in FIG. 4, a guiding and blocking apparatus 183 is fixedly secured to the upper part of the standard 167 for aiding the operator in selecting the desired operating modes of the winch 10. More particularly, the guiding and blocking apparatus defines a contoured or notched guide slot 185 for guiding movement of the upper lever portion 169 which extends upwardly therethrough. The guide slot includes a longitudinal first channel 187, a longitudinal second channel 189 laterally offset therefrom, and a blocking surface or shoulder 191 located generally between these channels. A foreshortened third channel or opening 193 is laterally offset from the second channel 189, and a holding surface or shoulder 195 is defined by the apparatus rearwardly of the third channel.

As is shown in solid lines in FIG. 4, the upper lever portion 169 of the control lever assembly 157 is positioned generally centrally of the first channel 187 in a Brake-On mode of operation of the winch 10. Moving the control lever assembly towards the operator or to the left when viewing FIG. 4 to the point where the upper lever portion reaches the proximal end of the guide slot 185 as shown in phantom at 169' provides Reel-In operation of the cable 18 on the drum 16. Moving the control lever assembly forwardly from the solid line position provides Brake-Off when the upper lever portion abuts the blocking shoulder 191 as shown in phantom at 169". In order to get to the Drum-Disconnect modes of operation provided by the drag brake apparatus 132, the upper lever portion must be moved outwardly against the resistance of the biasing mechanism 175, into the channel 189 and forwardly a preselected amount for one mode of operation, and moved fully forwardly and inwardly to the third channel 193 for another mode of operation which advantageously minimizes any accidental selection thereof.

The control mechanism 155 also includes a hydraulic valve assembly 197 of a conventional type such as is shown by U.S. Pat. No. 4,076,219 issued Feb. 28, 1978 to B. E. Behrends, et al. The valve assembly includes a control element or plunger 199 that is in operative contact with the second arm 165 of the bellcrank 159 for reciprocable movement along a vertical axis 201. Forward movement of the control lever assembly 157 rocks the second arm 165 downwardly to depress the plunger and to controllably direct hydraulic fluid to a hydraulic control circuit 202 for opration of the winch 10. When the control lever assembly is released from either of the phantom line positions 169' or 169" in the first channel 187 of the guide slot 185, it will automatically return to the centered solid line position corresponding to a Brake-On mode by a conventional return spring mechanism coupled between the bellcrank 159 and the standard 167 as is indicated generally by the reference number 203 in FIG. 5.

A source 205 of hydraulic fluid at a preselected pressure is connected to the valve assembly 197 by a supply line 207, and a drain line 209 communicates the valve assembly back to a sump or reservoir 211. A clutch control line 213 extends from the valve assembly to the clutch actuation chamber 81, a brake control line 215 extends therefrom to the brake retraction chamber 98, and a freespool disconnect line 217 extends therefrom to the disconnect retraction chamber 126.

The control mechanism 155 for the winch drag brake apparatus 132 further includes a two position, electrically actuated valve 219 having a solenoid 221 that is adapted to locate the valve in the rightward position illustrated in FIG. 4 when a line 223 is connected to a source of electricity 225. An electrical switch 227 connected to the electrical source by a line 228 is releasably mounted on the bellcrank 159 for pivotal movement therewith, and the switch has an upstanding depressible plunger 229. When the plunger is not depressed, electrical energy flows through the switch via the line 228 and to line 223 leading to the solenoid 221. As shown in FIGS. 4 and 5, an actuating arm 230 is rigidly secured to the upper lever portion 169 in such a manner above the plunger 229 that the plunger is depressed solely when the upper lever portion is located outwardly in the second channel 189. Depression of the plunger interrupts the flow of electricity to the solenoid such that the valve 219 is moved to the left of the position illustrated by a return spring 231. The drag brake actuation chamber 153 is in fluid communication with the valve 219 by a conduit or line 233, the sump 211 is connected to the valve by a drain line 235, and a branch line 237 connects the freespool disconnect line 217 to the valve. When the upper lever portion 169 is located in the second channel 189, the drag brake actuation chamber 153 is in open communication with the branch line 237, and when the upper lever portion is located in either of the first or third channels 187 and 193, the drag brake actuation chamber is in open communication with the drain line 235. The plunger 229 is urged upwardly to close the switch 227 by an internal spring, not shown, upon upward movement of the switch actuating arm 230.

INDUSTRIAL APPLICABILITY

In operation, the end of the cable 18 passes rearwardly from the winch drum 16 and over the fairlead sheave assembly 19 and is connected to one or more logs some distance away as can be visualized by reference to FIG. 1. The control lever assembly 157 is actuated from the Brake-On or the Neutral position shown in solid lines by the operator pulling it rearwardly to the Reel-In position shown partially in phantom at 169' in FIG. 4 and this elevates the plunger 199. In this mode the hydraulic valve assembly 197 directs pressurized fluid through the clutch control line 213 to the clutch actuation chamber 81 shown in FIG. 2. This causes the entire gear train 38 to rotate the winch drum. Simultaneously, the lines 215, 217 and 233 are vented. Accordingly, the brake mechanism 60 is mechanically engaged by the springs 96 and the sprag clutch 84 allows the cross shaft 56 to drive through the brake mechanism or to rotate in one direction. The logs are thereby hauled in and the front ends thereof are elevated and disposed against the butt plate of the vehicle 14.

Forward movement of the control lever assembly 157 by the operator from the Reel-In position to the solid line position illustrated causes corresponding depression of the plunger 199 to the Brake-On position which is effective to vent all of the lines 213, 215, 217, and 233. This disengages the input disc clutch assembly 42 and engages the brake mechanism 60 to hold the cable 18 and the elevated logs in position.

The log skidder vehicle 14 is usually then moved forwardly with the logs being dragged to a pick-up zone, and the winch 10 operated to controllably lower the logs. To achieve this the operator can rock the control lever assembly 157 forwardly to the phantom line position illustrated at 169″ where the upper lever portion 169 abuts the blocking shoulder 191 of the guide slot 185 which corresponds to the Brake-Off mode. This depresses plunger 199 an additional amount such that the valve assembly 197 directs pressurized fluid to the brake control line 215 and to the brake retraction chamber 98 and permits the brake mechanism to be released. This allows the weight of the logs to unwind the cable 18 from the drum 16, it being appreciated that the entire gear train 38 back to the disengaged input disc clutch assembly 42 is being rotated and this absorbs a considerable amount of energy which retards the dropping rate thereof.

If the operator wishes to controllably drop the logs at a rate faster than that provided by the Brake-Off mode, the drag brake apparatus 132 provides for this. The operator can move the upper lever portion 169 in a clockwise direction about the second axis 173 when viewing FIG. 5 so that it moves laterally away from the blocking shoulder 191 and into the second channel 189 illustrated in FIG. 4. This movement depresses switch actuating arm 230 and disconnects the switch 227 such that the source of electricity is cut off from the solenoid 221. Thereupon the spring 231 moves the valve 219 to the left of the position illustrated in FIG. 4 and communicates the drag brake actuation chamber 153 with the branch line 237 communicating with the freespool disconnect line 217. Further forward movement of the control lever assembly rotates second arm 165 of the bellcrank 159 to depress the plunger 199 an amount sufficient to vent the clutch actuation chamber 81 by connecting the control line 213 to the sump 211, and to communicate pressurized fluid from the pressure source 205 to both of the lines 215 and 217. This maintains the brake mechanism 60 disengaged so that cable 18 can be reeled out, and simultaneously urges the piston element 122 of the shifting fork actuator 118 to the right when viewing FIG. 3 because the retraction chamber 126 is pressurized. The sliding collar 110 is thus uncoupled from the coupling teeth 112 of the intermediate pinion gear 72 so that the drum 16 and the gears 72 and 74 can rotate free of the natural drag effect of the intermeshing gears 64,62,54,52,48 and 44. Simultaneously, the hydraulic valve assembly 197 communicates pressure in the branch line 237 through the repositioned valve 219 to the drag brake actuation chamber 153. This actuation chamber is pressurized, for example at about 2,070 KPa (300 p.s.i.), sufficient to urge the spool 144 and braking element 135 to the right when viewing FIG. 3. This provides a preselected and moderate amount of force against the end surface 148 of the revolving drum which resists overspinning thereof when the logs contact the ground, and thereby minimizes any tendency of the cable to "bird nest". Nevertheless, the force provided against the drum by the auxiliary brake means 134 allows the logs to be controllably lowered at a rate considerably faster than the Brake-Off mode previously described.

A second Drum-Disconnect mode of operation can be achieved by moving the upper lever portion 169 of the control lever assembly 157 laterally from the second channel 189 to the third channel 193. This rotates the upper lever portion in a counterclockwise direction when viewing FIG. 5 and allows the switch plunger 229 to be raised. This closes the electrical switch 227, communicates electrical energy from the source 225 to the solenoid 221, and moves the valve 219 back to the position illustrated in FIG. 4. Whereupon the conduit 233 is in open communication with the sump 211 via line 235 and there no longer is pressurized fluid in the chamber 153 of the actuator means 136. Hence, the spring 152 provides only a relatively low force upon the spool 144 such that the braking element 135 contacts the drum with but minimal resistance to rotation. This minimal force can be adjusted manually, if desired, by screwthreadably positioning the spring seat 150 axially to the desired setting, and can be tailored to the amount of effort required to pull the cable 18 off of the drum 16 by hand while preventing overspinning thereof when the pull off is stopped.

In this second Drum-Disconnect mode the upper lever portion is in the third channel 193 as is indicated in phantom lines at 169". If the control lever assembly is released by the operator at this stage, the force of the biasing mechanism 175 and the contact with the holding shoulder 195 will serve to maintain it in that location.

Second Embodiment

Figure 6:
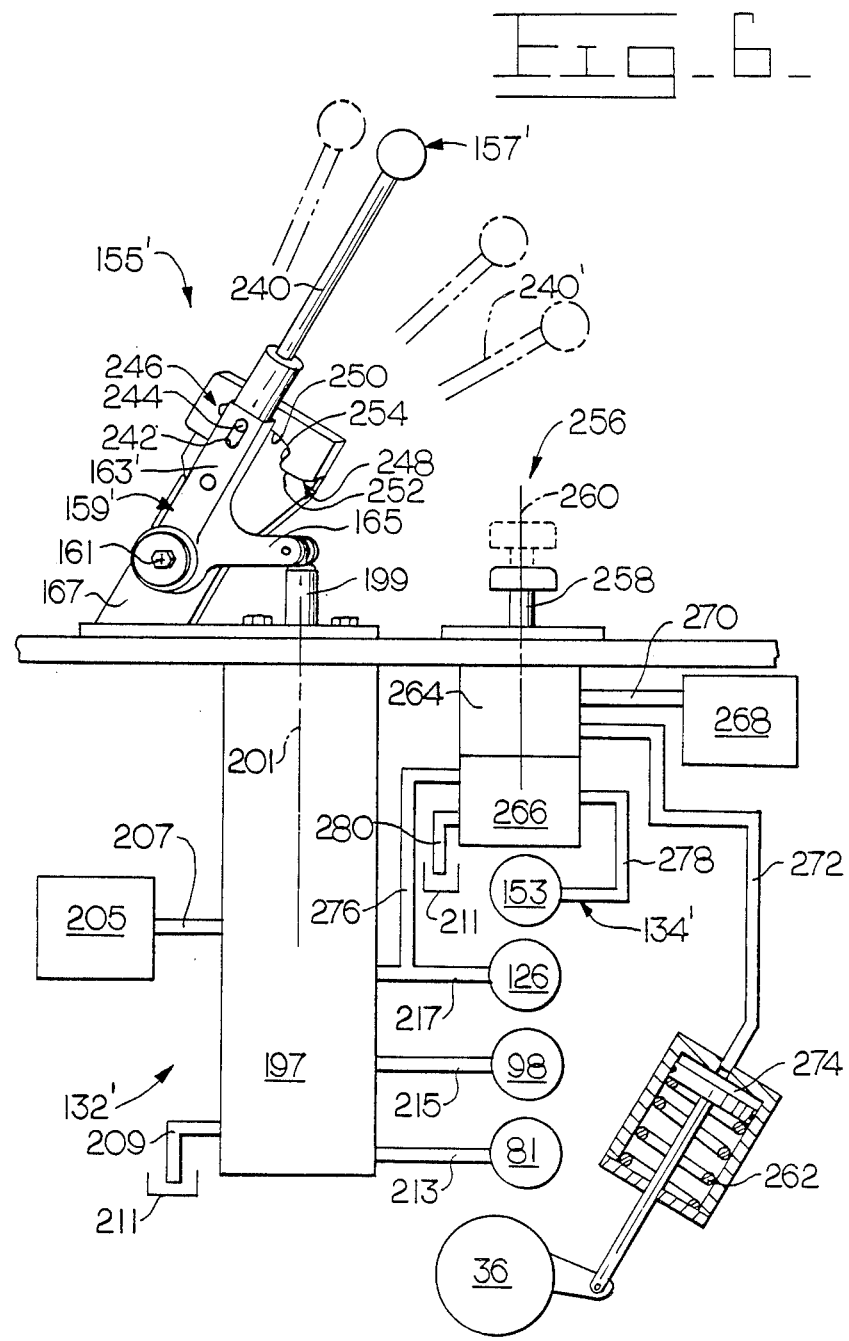
FIG. 6 is a diagrammatic elevational view of a winch control lever assembly and a parking brake control assembly showing the relationship thereof to a hydraulic circuit and a pressurized air circuit for controlling the winch of FIGS. 1-3 and the vehicle parking brake associated therewith in accordance with a second embodiment of the present invention.

It is also contemplated that two modes of Drum-Disconnect operation of the winch drum 16 can be achieved in another way as is illustrated in FIG. 6. In this second embodiment parts corresponding to those described earlier are identified with the same reference number, and parts which have been modified have been identified by the same reference number with a prime indicator affixed thereto.

The control lever assembly 157' differs in that lower bellcrank 159' has a hollow upwardly extending first arm 163', and an upper lever portion or depressible control lever 240 thereof is telescopically mounted in the first arm. The first arm defines a pair of slots at the opposite sides thereof, one of which is shown at 242, and a cross pin 244 which is secured to the control lever extends outwardly through the slots. The control lever is continually urged upwardly by a relatively light spring within the first arm, not shown.

A guiding and blocking apparatus 246 is provided at the upper part of the fixed standard or pedestal 167 for aiding the operator in selecting the desired operating modes of the winch 10. The guiding and blocking means includes a generally downwardly facing contoured guide surface 248 having a first portion 250 at a first preselected radius from the axis 161, a second portion 252 at a generally second preselected radius from the axis which is less than that of the first radius, and a movement-inhibiting blocking surface or shoulder 254 defined therebetween. One end of the cross pin 244 is adapted to travel along the guide surface 248 to better define certain modes of operation of the control mechanism 155'.

The control lever 240 is positioned generally centrally of the first portion 250 of the guide surface 248 in a Brake-On mode as shown in solid lines in FIG. 6. Moving the control lever in a counterclockwise direction about the axis 161 or to the left when viewing FIG. 6 to the point wherein the cross pin 244 reaches the proximal end of the guide surface 248 provides Reel-In operation. Moving the control lever forwardly of the solid line position in a straight line from a top view provides Brake-Off when the cross pin abuts the shoulder 254. In order to get to the Drum-Disconnect modes provided by the drag brake apparatus 132, the control lever must be depressed and moved forwardly which, again, desirably minimizes the accidental selection thereof.

The second embodiment also includes a parking brake control assembly 256 having a control plunger or member 258 which is manually positionable along a central axis 260 to either the depressed solid line position or the raised phantom line position illustrated in FIG. 6. In the depressed position thereof the hydraulically disengaged and spring engaged parking brake 36 is released, and in the elevated position thereof the parking brake is mechanically engaged by one or more compression springs 262. The parking brake control assembly 256 includes an upper air valve assembly 264 and a juxtaposed lower hydraulic valve assembly 266 which are simultaneously actuated by movement of the plunger 258. A source 268 of air at a preselected pressure is in communication with the air valve assembly 264 via an inlet conduit 270, and an air outlet conduit 272 therefrom is in communication with a chamber 274 of the parking brake 36. The hydraulic valve assembly 266 is in fluid communication with the disconnect line 217 by way of a branch line 276 and has an outlet line 278 connected to the drag brake actuation chamber 153. Another drain line 280 is also connected to the hydraulic valve assembly 266 for returning fluid to the reservoir 211.

In operation, the control lever 240 can be moved in a clockwise direction when viewing FIG. 6 from the Reel-In position, to the Brake-On position, and then to the Brake-Off position which is achieved in the same manner as the first embodiment by the gradual depression of the plunger 199 by the second arm 165 of the bellcrank 159'. Normally, the parking brake 36 is maintained in a disengaged state by manually positioning the control plunger 258 to its depressed solid line position. Under these circumstances, the air valve assembly 264 communicates pressurized air to the conduit 272 and to the chamber 274 for overcoming the force of the engagement spring 262. Assuming that the parking brake is disengaged, the operator can telescopically depress the control lever 240 until the cross pin 244 is out of contact with the shoulder 254 so that the control lever can be moved forwardly into the front Drum-Disconnect position. The second arm 165 of the bellcrank 159' depresses the plunger 199 the maximum amount when the control lever reaches the phantom line position identified by the reference number 240'. With such plunger movement the valve assembly 197 vents the clutch actuation chamber 81 and delivers pressurized fluid to the lines 215 and 217. This maintains the brake mechanism 60 of FIG. 2 disengaged and positions the sliding collar 110 of FIG. 3 to the right so that the cable drum 16 is relatively free to rotate. At the same time, the hydraulic valve assembly 266 communicates pressure from the branch line 276 to the branch line 278 and the drag brake actuation chamber 153. This urges the spool 144 and braking element 135 of FIG. 3 against the drum with a preselected and moderate amount of force to resist overspinning when dropping a heavy load, for example, at a rate faster than that allowed by the Brake-Off mode.

With the second embodiment, the second Drum-Disconnect mode is achieved by simply elevating the control plunger 258 of the parking brake control assembly 256 without further movement of the control level assembly 157'. In such raised position of the plunger, the air valve 264 vents conduit 272 to the atmosphere so that the spring 262 engages the parking brake 36, and the hydraulic valve assembly 266 communicates the outlet line 278 with the reservoir 211 through the conduit 280 so that chamber 153 is depressurized. Therefore, only a relatively low force is provided by the spring 152 upon the spool of FIG. 3 so as to allow the cable to be pulled off the drum 16.

Thus, it can be appreciated that the winch drag brake apparatus 132 is simple and reliable and can provide two distinct force levels of drag braking of the winch drum 16 in the Drum-Disconnect mode. In the first embodiment of FIG. 4, the upper lever portion 169 of the control lever assembly 157 is limitedly pivoted about the lower bellcrank 159 so that it moves into the second channel 189 and is moved longitudinall forwardly therein a preselected distance in order to obtain the maximum drag brake force. And the minimum drag brake force is obtained by pivoting the upper lever portion to the third channel 193 of the guide slot 185 without any interaction with the parking brakes. In the second embodiment of FIG. 6, the upper control lever 240 is telescopically depressed and moved forwardly, and maximum drag brake force is obtained with the parking brake control plunger 258 depressed and the parking brake 36 released. The control plunger 258 is raised while the control lever assembly 157' is in the same Drum-Disconnect position in order to provide a minimum drag brake force on the drum. In each embodiment, the minimal drag brake force is provided solely by the resilient loading of the spring 152, and the maximum drag brake force is provided by the combined loading of the spring and the hydraulic pressure against the spool 144.

Should the operator wish to slow down the rate of descent of the logs from the moderate drag brake level achieved with the drag brake actuation chamber 153 pressurized, the control lever assembly 157 can be moved back to the Brake-Off mode. This will cause the sliding collar 110 of the disconnect device 70 to be moved to the left when viewing FIG. 3, whereupon the coupling teeth 116 will abut the coupling teeth 112 at a relative speed difference less than that of the prior art mechanisms so that they can reengage more easily and have an extended service life.

Other aspects, objects, and disadvantages of this invention can be obtained from a study of the drawings, the disclosure, and the appended claims.

We claim:

1. A winch drag brake apparatus for a winch having a drum, a power train for controllably rotating the drum, a primary brake mechanism having an engaged position for preventing rotation of the power train and a disengaged condition, and disconnect means for uncoupling the power train adjacent the drum in a disengaged position thereof, the drag brake apparatus comprising:
   control mechanism means including a single control lever assembly for controlling operation of the power train, the primary brake mechanism, and the disconnect means, the control lever assembly being movable to a preselected region for effecting the disengaged position of the disconnect means; and
   auxiliary brake means for limitedly restricting rotation of the drum when the control lever assembly is in the preselected region, the primary brake mechanism is in the disengaged condition, and the disconnect means is in the disengaged position by providing a first drag brake mode for substantially freespool operation of the drum and a second drag brake mode for controlled load dropping operation of the drum in response to selective operation of the control lever assembly of the control mechanism means.

2. The apparatus of claim 1 wherein the control mechanism means includes means defining a profiled guide slot and the control lever assembly includes an upper lever portion movable in the guide slot to first and second positions within the preselected region for effecting the first and second drag brake modes respectively.

3. The apparatus of claim 2 wherein the control lever assembly includes a lower lever portion, means for supporting the lower lever portion for rotation about a first axis, and means for supporting the upper lever portion on the lower lever portion for rotation about a second axis normal to the first axis.

4. The apparatus of claim 1 wherein the control mechanism means includes a fluid pressure source, a hydraulic valve assembly connected to the source and operated by movement of the control lever assembly, and an electrically operated valve connected between the hydraulic valve assembly and the auxiliary brake means and responsive to movement of the control lever assembly.

5. The apparatus of claim 4 wherein the control lever assembly includes a lower lever portion and an upper lever portion pivotally mounted on the lower lever portion, and the control mechanism means includes an electrical switch mounted on the lower lever portion, electrically connected to the electrically operated valve, and mechanically operated by movement of the upper lever portion.

6. The apparatus of claim 1 wherein the control mechanism means includes hydraulic means for selectively directing pressurized hydraulic fluid to the auxiliary brake means and effecting the second drag brake mode, and means for interrupting the delivery of pressurized hydraulic fluid to the auxiliary brake means by the hydraulic means and effecting the first drag brake mode.

7. The apparatus of claim 1 wherein the control mechanism means includes a fluid pressure source and an electrically actuated valve operatively disposed between the pressure source and the auxiliary brake means, and the auxiliary brake means includes a source of electricity and an electrical witch connected to the source of electricity and to the electrically actuated valve, and the switch is actuated in response to movement of the control lever assembly to a preselected position.

8. The apparatus of claim 1 wherein the auxiliary brake means includes actuator means for solely mechanically effecting the first drag brake mode, and the control mechanism means includes valve means for selectively directing pressurized fluid to the auxiliary brake means for hydraulically and mechanically effecting the second drag brake mode.

9. The apparatus of claim 8 wherein the actuator means includes a drag brake actuation chamber, and the valve means includes an electrically operated valve commuicating pressurized fluid to the actuation chamber solely in the second drag brake mode.

10. A winch drag brake apparatus for a winch having a drum, a power train for controllably rotating and braking the drum, and disconnect means for uncoupling the power train adjacent the drum in a disengaged position thereof, the drag brake apparatus comprising:
    control mechanism means for controlling operation of the power train and the disconnect means, the control mechanism means having a control lever assembly movable to a preselected region for effecting the disengaged position of the disconnect means; and
    auxiliary brake means for limitedly restricting rotation of the drum when the control lever assembly is in the preselected region and the disconnect means is in the disengaged position by providing a first drag brake mode for substantially freespool operation of the drum and a second drag brake mode for controlled load dropping operation of the drum in response to selective operation of the control mechanism means, the auxiliary brake means including a braking element and actuator means for hydraulically urging the element against the drum in the second drag brake mode, the actuator means including a compression spring continually urging the braking element against the drum.

11. The apparatus of claim 10 wherein the control mechanism means includes electrical means for cooperating with the actuator means and selecting one of the firt and second drag brake modes in response to movement of the control lever assembly.

12. The apparatus of claim 11 wherein the control mechanism means includes means defining a profiled guide slot, and the control lever assembly includes an upper lever portion extending upwardly through the guide slot and movable to first and second positions within the preselected region, the upper lever portion being disposed in cooperating relationship with the electrical means in the first position.

13. A winch drag brake apparatus for a winch having a drum, a power train for controllably rotating the drum, a disconnect device for uncoupling the power train adjacent the drum in a disengaged position thereof and having an engaged position, and a primary brake mechanism having an engaged condition for preventing rotation of the power train and a disengaged condition, the drag brake apparatus comprising:
  auxiliary brake means for limitedly restricting rotation of the drum in the disengaged position of the disconnect device and the disengaged condition of the primary brake mechanism; and
  control mechanism means for controlling operation of the power train, the disconnect device, and the primary brake mechanism, and for controllably placing the auxiliary brake means into one of a first drag brake mode providing a relatively low friction drag level upon the drum and a second drag brake mode providing a relatively moderate friction drag level upon the drum when the disconnect device is in the disengaged position and the brake mechanism is in the disengaged condition.

14. The apparatus of claim 13 wherein the auxiliary brake means includes a braking element and actuator means for solely mechanically urging the braking element against the drum in the first drag brake mode and for mechanically and hydraulically urging the braking element against the drum in the second drag brake mode.

15. The apparatus of claim 14 wherein the control mechanism means includes a source of pressurized fluid, a control lever assembly movable between a plurality of operating positions for operating the winch and placing the disconnect device in the disengaged position, and operating means for communicating the pressurized source to the actuator means and obtaining the second drag brake mode solely in response to moving the control lever assembly to one of said positions.

16. The apparatus of claim 15 wherein the operating means includes a hydraulic valve assembly connected to the source, an electrically operated valve in fluid communication with the hydraulic valve assembly, and switch means for communicating electrical energy to the electrically operated valve in response to moving the control lever assembly to the one position.

17. The apparatus of claim 13 wherein the auxiliary brake means includes a braking element and actuator means for continuously mechanically urging the braking element into low force friction engagement with the drum.

18. The apparatus of claim 17 wherein the control mechanism means includes means for selectively communicating pressurized fluid to the actuator means and urging the braking element into engagement with the drum at a force level greater than said low force friction engagement level.

19. The apparatus of claim 13 wherein the control mechanism means includes a control lever assembly having a lower lever portion mounted for pivotal movement about a first axis, an upper lever portion mounted for pivotal movement on the lower lever portion about a second axis, a hydraulic valve assembly operated by pivotal movement of the lower lever portion, and means connected to the hydraulic valve assembly for selectively directing pressurized fluid to the auxiliary brake means upon pivotal movement of the upper lever portion.

20. The apparatus of claim 19 wherein the means connected to the hydraulic valve assembly includes an electrically actuated valve and an electrical switch connected to the lower lever portion and actuated by pivotal movement of the upper lever portion.

* * * * *